United States Patent [19]

Qvint et al.

[11] Patent Number: 4,928,992
[45] Date of Patent: May 29, 1990

[54] SEAT BELT BUCKLE ARRANGEMENT

[75] Inventors: Peter Qvint, Vargarda; Tommy Andersson, Alingsas; Lennart Eksell, Boras, all of Sweden

[73] Assignee: General Engineering (Netherlands) B.V., Utrecht, Netherlands

[21] Appl. No.: 265,139

[22] PCT Filed: Feb. 26, 1988

[86] PCT No.: PCT/SE88/00084
§ 371 Date: Oct. 26, 1988
§ 102(e) Date: Oct. 26, 1988

[87] PCT Pub. No.: WO88/06543
PCT Pub. Date: Sep. 7, 1988

[30] Foreign Application Priority Data

Feb. 26, 1987 [GB] United Kingdom ............... 8704496

[51] Int. Cl.⁵ ............................................. B60R 22/22
[52] U.S. Cl. .................................. 280/801; 296/65.1; 297/468
[58] Field of Search ................... 280/801; 296/65.1; 297/468, 482, 483

[56] References Cited

U.S. PATENT DOCUMENTS

| | | | |
|---|---|---|---|
| 2,904,347 | 9/1959 | Tucker | 297/468 |
| 3,482,872 | 12/1960 | Chamberlain | 297/468 X |
| 4,129,320 | 12/1978 | Fancy | 280/801 |
| 4,133,556 | 1/1979 | Glinski | 280/801 |
| 4,199,190 | 4/1980 | Linblad | 297/468 |

FOREIGN PATENT DOCUMENTS

| | | |
|---|---|---|
| 0004485 | 10/1979 | European Pat. Off. . |
| 1456188 | 7/1969 | Fed. Rep. of Germany . |
| 2656121 | 6/1977 | Fed. Rep. of Germany . |
| 2823018 | 12/1978 | Fed. Rep. of Germany . |
| 2175255 | 10/1973 | France . |
| 8001351 | 8/1981 | Sweden . |

Primary Examiner—Charles A. Marmor
Assistant Examiner—Tamara L. Finlay
Attorney, Agent, or Firm—Spencer & Frank

[57] ABSTRACT

A seat belt buckle arrangement incorporating a buckle having an open mouth for receiving a tongue and for retaining the tongue therein. Part of the buckle is connected by a flexible connection to an anchoring point on a motor vehicle. There is a resilient element extending between the anchoring point and the buckle for holding the buckle in a position in which the open mouth of the buckle is presented to receive the tongue.

13 Claims, 3 Drawing Sheets

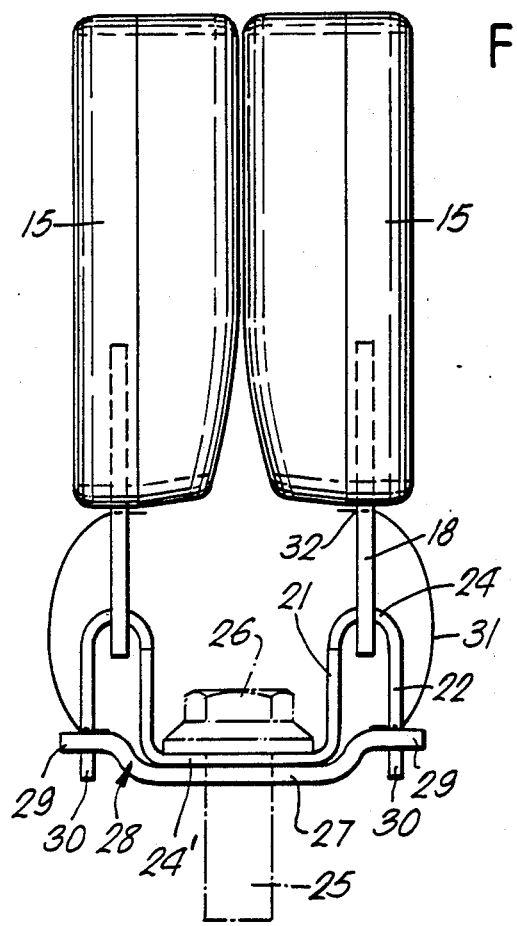
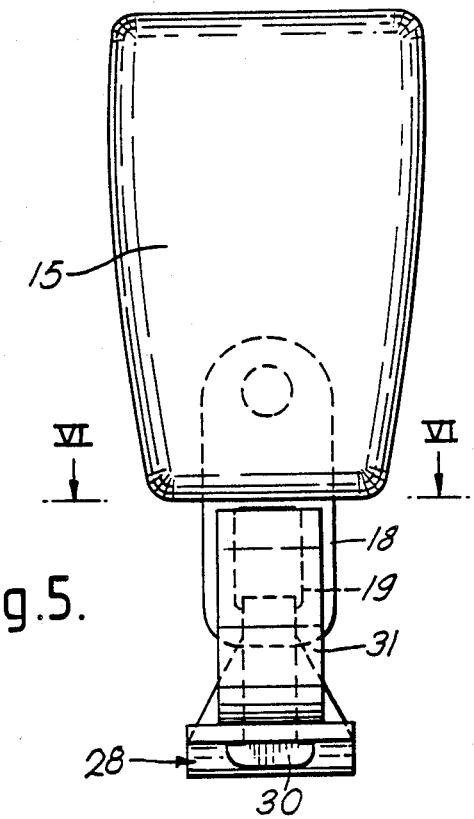

SEAT BELT BUCKLE ARRANGEMENT

The present invention relates to a seat belt buckle arrangement and more particularly relates to a seat belt buckle arrangement intended for use in motor cars.

It is now conventional to provide seat belts for use in a motor car, the seat belts each being provided with a tongue which is to be inserted into a respective buckle.

Where such a seat belt is fitted to the front seats of motor vehicles, it is common for the buckle to be mounted on a rigid steel strap, or on a substantially rigid wire, so that the buckle is always in a suitable position, adjacent the side of the seat, with an open mouth of the buckle being readily accessible to facilitate the insertion of the tongue into the buckle.

It is now becoming more common to fit seat belts to the rear seats of motor vehicles. It is also becoming common for the rear seats of vehicles to be adapted to be folded down to increase the load-carrying capacity of the vehicle. Such folding seats are present in motor cars of the "estate car" type and are also present in motor cars of the "hatch back" type. Indeed such seats are sometimes found on motor cars of the type which have a separate boot.

When a safety belt system is fitted to a rear seat of this folding type it is not possible to utilise a rigid steel plate or a substantially stiff wire to hold the buckle for the safety belt in such a position that the mouth of the buckle is presented in such a way that the mouth is readily accessible to receive the tongue of the safety belt. Instead it is conventional for such safety belts to be mounted on portions of webbing strap, often made of the same material as the rest of the safety belt. The buckles thus lie relatively loosely on the seat, which facilitates the folding of the seat, but does not facilitate the introduction of the tongue into the safety belt. Indeed, with the buckles lying loosely on the seat it is often the case that a person getting into the rear seat actually sits on the buckle, and may not then be able to fit the tongue into the buckle without significant inconvenience. In such a case the person may not even bother to wear the safety belt, which is clearly undesirable.

It is also to be understood that the rear seats of motor vehicles are often designed to accommodate three people, and if such a seat is provided with safety belts, with buckles substantially rigidly mounted in position protruding above the level of the seat squab, any person who is to occupy the middle seat must effectively climb over at least one projecting seat belt buckle. This can be very inconvenient.

Thus the present invention seeks to provide a seat belt buckle arrangement intended especially for use in the rear seat of a motor vehicle which overcomes the disadvantages of prior proposed buckles as described above. However, a seat belt buckle arrangement of the invention may be used with a buckle on any seat.

According to this invention there is provided a safety belt arrangement incorporating a buckle defining an open mouth to receive a tongue, the buckle comprising means to retain the tongue therein, the buckle being connected by a flexible connection to an anchoring point on a motor vehicle, there being a resilient member between the anchoring point and the buckle adapted to hold the buckle in a position in which the open mouth of the buckle is presented to receive the tongue. Preferably said flexible connection comprises two or more interconnected rigid links. Advantageously the link furthest from the buckle is associated with a bolt to secure the flexible connection to an anchoring point.

In one embodiment the links form a chain, one end of which is connected to a buckle. Alternatively one link is an apertured plate secured to the buckle and a second extends link through the aperture. Preferably the second link comprises an element which is secured to the anchoring point and which has a projecting bight with two substantially parallel arms, the bight passing through the aperture. Conveniently the element is associated with a base plate, the arm of the bight remote from the anchoring point passing through an aperture in the base plate.

Conveniently the resilient member is formed of rubber or rubber-like material. Advantageously the resilient member is in the form of a sleeve surrounding the flexible connection. Conveniently the sleeve is an integrally moulded sleeve.

Advantageously the end of the sleeve adjacent the buckle is closed, so that the sleeve engages part of the buckle to present the buckle in a predetermined manner. Conveniently the end of the sleeve remote from the buckle is notched to receive means connected to the anchoring point.

Alternatively the resilient member is an elongate strip of spring metal. Conveniently one end of the spring metal strip is mounted on the buckle and the other end is secured directly or indirectly to the anchoring point.

In order that the invention may be more readily understood, and so that further features thereof may be appreciated, the invention will now be described, by way of example, with reference to the accompanying drawings, in which:

FIG. 4 is a front view of another embodiment of the invention,

FIG. 5 is a side view of the embodiment of FIG. 3,

Figure 1:
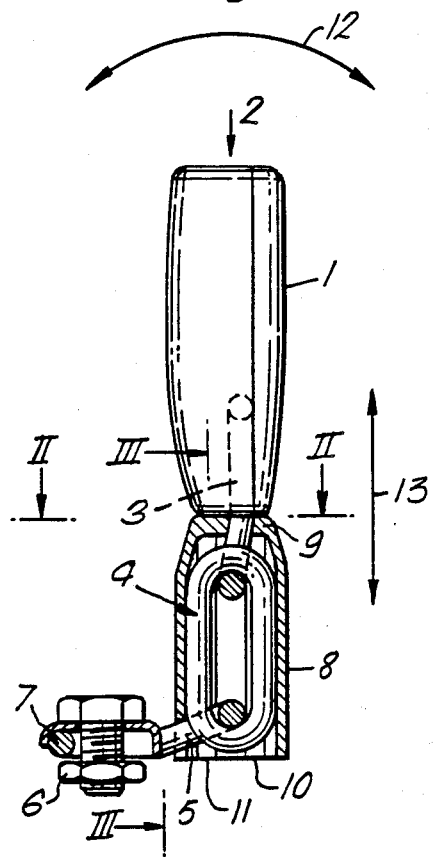
FIG. 1 is a diagrammatic side view of one embodiment of the invention, with parts cut away.
Figure 3:
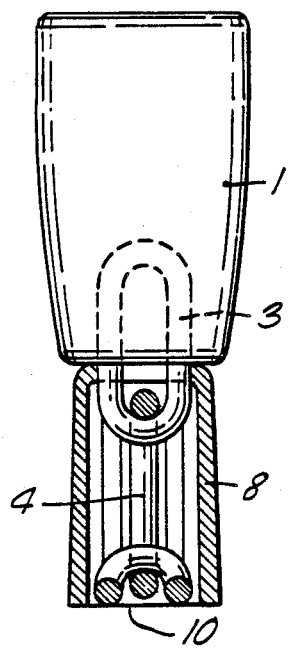
FIG. 3 is a sectional view taken on line III—III of FIG. 1.
Figure 2:
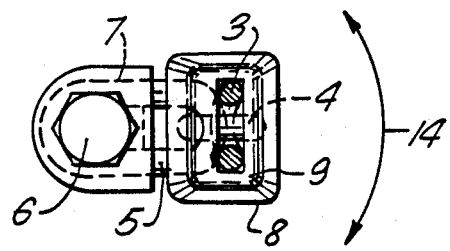
FIG. 2 is a sectional view taken on line II—II of FIG.1.
Figure 7:
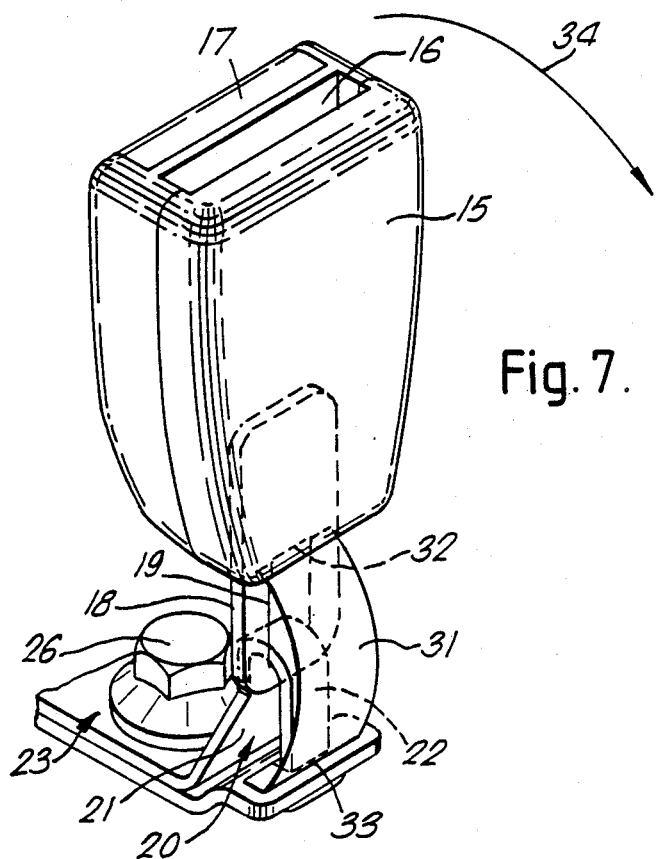
FIG. 7 is a perspective view of part of the embodiment of FIGS. 4 to 6.
Figure 6:
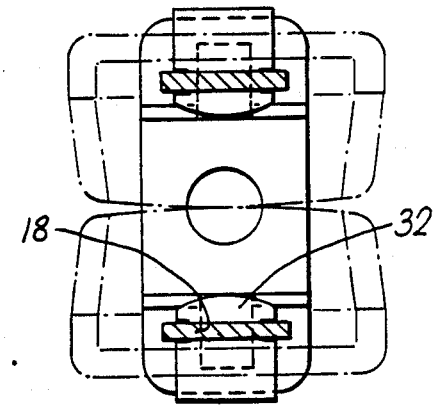
FIG. 6 is a sectional view taken on the line VI—VI of FIG. 5 with the position of the buckles shown in phantom.

Referring to FIGS. 1 to 3 of the drawings it can be seen that one example of a seat belt buckle arrangement in accordance with the invention comprises a conventional buckle 1 adapted to receive the tongue of a safety belt. The buckle comprises an outer housing, which defines a mouth 2 through which the tongue may be introduced to the buckle. The buckle contains a mechanism adapted to engage and retain the tongue until a release button is pressed. Buckles of this type are conventional.

The end of the buckle remote from the open mouth is securely connected to a connection means 3 comprising one of a plurality of substantially rigid interconnected links, the links being in the form of a chain 4. The link 5 end of the chain remote from the buckle 1 is intended to be secured to an appropriate anchoring point formed on a motor vehicle body, by means of a bolt 6. The bolt may be associated with an appropriate washer, which may be flanged to engage the link 5 of the chain. The link 5 is cranked whereas the remaining links are substantially flat oval links.

The chain is, of course, flexible in that the links can move relative to each other, and the links of the chain are so designed that the chain is strong enough to withstand any force that may be applied thereto under accident conditions.

Surrounding the chain is a shaped sleeve 8 formed of a resiliently deformable material, such as a moulded rubber material. At the end adjacent the buckle, the sleeve is substantially closed 9, so that part of the sleeve engages the part of the buckle remote from the mouth of the buckle. The sleeve is of generally cylindrical configuration, and at the end of the sleeve remote from the buckle, the sleeve defines an open mouth 10 and part of the end of the sleeve is cut away or "notched" the notch being dimensioned to receive the last link of the chain which is connected to the bolt.

It is to be understood that the sleeve 8 will, in ordinary circumstances, stand erect, the open end of the sleeve engaging part of the motor vehicle adjacent the anchoring point to which the chain is connected, the sleeve thus serving to hold the bukle in an erect position with the mouth of the buckle presented in such a way that insertion of the tongue into the buckle is facilitated. However, the sleeve is resiliently deformable and the buckle is thus able to move relatively freely in all directions, as indicated by the arrows 12, 13, 14, if sufficient force is applied to the buckle to deform the sleeve. As can be seen, the three directions 12, 13 and 14 lie in different orthogonal planes. Thus if, for example, the buckle is mounted in position on a rear seat of a motor vehicle, with the buckle projecting up above the squab of the seat, and if a person wishes to slide along the squab of the seat past the buckle, the buckle will be moved, against the resilient bias of the sleeve, from its initial projecting position, so that the buckle will not significantly inconvenience a person sliding across the seat. However, when that person has slid across the seat, the sleeve will re-assume its initial position, thus again holding the buckle in a position where the mouth of the buckle is readily accessible to the tongue of the buckle.

If a person accidentally sits on top of the buckle, the sleeve 8 will resiliently collapse, so that the person will not suffer severe discomfort. If the buckle is mounted on a foldable seat, as the seat is folded the resilient sleeve will be deformed so that the buckle can occupy an appropriate position when the seat is in the folded condition. However, when the seat is returned to the upright position the buckle will return to the erect position.

Whilst the invention has been described above with reference to one embodiment in which the chain has only a few links it is to be appreciated that the chain may have more links in certain circumstances, or may have fewer links. Also, whilst the invention has been described with reference to an embodiment in which a moulded cylindrical sleeve is utilised as a resilient member, it is to be understood that the resilient member may take many different forms. For example, the resilient member may be in the form of a resilient rod lying parallel with the chain, or may be in the form of a resilient member in the form of a helix wrapped helically around the chain.

Referring now to FIGS. 4 to 7 of the accompanying drawings a second embodiment of the invention is illustrated. In this embodiment two buckles 15 are provided, each of a conventional design and having a slot 16 to receive the tongue mounted on a safety belt, and a push-button 17 operable to eject the tongue from the buckle. Each buckle 15 has secured thereto and projecting therefrom an elongate plate 18 which is provided with an elongate aperture 19 therein.

Passing through the aperture 19 is a bight 20 formed of two parallel arms 21,22 which are formed on a securing element 23. The arms 21,22 are substantially vertical and are substantially parallel, the upper ends of the arms being interconnected by an arcuate portion 24. The arcuate portion 24 is illustrated as passing through the lower part of the aperture 19.

The securing element 23 has a substantially horizontally extending central portion 24' which is provided with an aperture through which passes the shank 25 of an anchoring bolt 26. The other side of the securing element is provided with a similar arrangement mounting the second buckle.

It is to be noted that mounted under the horizontal part of 24' of the securing element 23 is a horizontal part 27 of a mounting plate 28. The shank 25 of the bolt 26 passes through an aperture formed in the central region 27 of the mounting plate 28.

The mounting plate 28 is of elongate form, the ends 29 being raised above the level of the central portion 27. The raised regions 29 of the mounting plate 28 are provided with apertures through which pass the free ends 30 of the arms 22 of the bight portions 20.

The apertured plate 18, in combination with the bight 20, forms a connection between the anchoring point and the buckle, this connection being flexible in that the buckle may readily be moved relative to the anchoring point.

The buckle 15 is biassed towards the illustrated elevative position by means of a resilient element formed by a strip 31 of springy or resilient metal. One end 32 of the strip passes through the aperture 18. This end may be of "tee" configuration so that the end of the strip engages the aperture and cannot be readily disengaged therefrom. The other lower end 33 of the strip, which is again of "tee" configuration, passes through an aperture formed in the free end 30 of the arm 22.

Thus the springy strip effectively has one end connected to the buckle, and the other end connected indirectly to the anchoring point. The springy strip 31 provides a resilient bias to the buckle 15, biassing the buckle to the presented position. If a downward force is applied to the buckle 15, the buckle will move downwardly, compressing the springy strip. The arcuate portion 24 of the bight 20 will thus effectively move upwardly within the aperture 19. The buckle 15 may also be moved in a pivotal direction, for example in the direction indicated by the arrow 34 in FIG. 7. In this case the springy strip will again be compressed. However, the buckle may be moved to a horizontal position and may then even be lowered slightly.

It will be appreciated that many modifications may be effected to the embodiment illustrated in FIGS. 4 to 7 of the accompanying drawings. For example, the springy strip 31 may be replaced by a wire spring, preferably with the same shape as a safety pin, so that the buckle can move downwardly and also be moved in any pivotal direction.

We claim:
1. A safety belt arrangement comprising:
   a buckle having an open mouth for receiving a tongue, said buckle comprising means for retaining said tongue therein;

a flexible connection means for connecting said buckle to an anchoring point on a motor vehicle, said flexible connection means comprising two or more interconnected rigid links for preventing said buckle from moving more than a predetermined distance away from said anchoring point and for allowing said buckle to be moved closer than the predetermined distance towards said anchoring point and;

a resilient member connected to said anchoring point and said buckle for holding said buckle in a position in which the open mouth of the buckle is presented for receiving said tongue.

2. The arrangement according to claim 1, wherein said links comprise a chain, said chain having an end connected to said buckle, and the link furthest from the buckle is associated with a bolt for securing said flexible connection means to the anchoring point.

3. The arrangement according to claim 1, wherein one said link is an apertured plate secured to said buckle and a second said link extends through an aperture of said aperture plate.

4. The arrangement according to claim 3, wherein said second link comprises an element which is secured to the anchoring point and which has a projecting bight with two arms, said arms passing through said aperture of said plate.

5. The arrangement according to claim 4, wherein said arms of said projecting bight are substantially parallel and have an interconnecting arcuate portion passing through said aperture of the plate.

6. The arrangement according to claim 1, wherein said resilient member is an elongate strip of string metal.

7. The arrangement according to claim 6, wherein one end of said spring metal strip is mounted on the buckle and the other end is secured to said anchoring point.

8. The arrangement according to claim 7, wherein the other end of the spring metal strip is secured directly to said anchoring point.

9. The arrangement according to claim 7, wherein the other end of the spring metal strip is secured indirectly to said anchoring point.

10. The arrangement according to claim 1, wherein said resilient member is a wire spring.

11. The arrangement according to claim 1, wherein said resilient member comprises a resilient sleeve around said rigid links.

12. The arrangement according to claim 1, wherein said resilient member allows the length of said flexible connection to be compressed in a direction towards said anchoring point.

13. The arrangement according to claim 1, wherein said resilient member allows said buckle to be moved in at least three orthogonal planes and wherein said resilient member exerts a restoring force in said at least three orthogonal planes.

* * * * *